United States Patent [19]

Ma: Thomas T.

[11] Patent Number: 5,441,023
[45] Date of Patent: Aug. 15, 1995

[54] TUNED ENGINE MANIFOLD

[75] Inventor: Ma: Thomas T., Chelmsford, United Kingdom

[73] Assignee: Ford Motor Company, Dearborn, Mich.

[21] Appl. No.: 162,130
[22] PCT Filed: Jun. 10, 1992
[86] PCT No.: PCT/GB92/01036
§ 371 Date: Dec. 9, 1993
§ 102(e) Date: Dec. 9, 1993
[87] PCT Pub. No.: WO92/22738
PCT Pub. Date: Dec. 23, 1992

[30] Foreign Application Priority Data

Jun. 10, 1991 [GB] United Kingdom ............... 9112451

[51] Int. Cl.[6] ............................................. F02M 35/10
[52] U.S. Cl. ............................................. 123/184.57
[58] Field of Search ................... 123/184.53, 184.57

[56] References Cited

U.S. PATENT DOCUMENTS

| | | | |
|---|---|---|---|
| 4,109,752 | 8/1978 | Ferralli | 181/252 |
| 4,153,136 | 5/1979 | Ferralli | 181/252 |
| 4,974,568 | 12/1990 | Cser | 123/184.57 |
| 5,002,021 | 3/1991 | Nakata et al. | 123/184.57 |
| 5,040,495 | 8/1991 | Harada et al. | 123/184.57 |
| 5,107,800 | 4/1992 | Araki et al. | 123/184.57 |

FOREIGN PATENT DOCUMENTS 0152153  8/1985  European Pat. Off. .

*Primary Examiner*—David A. Okonsky
*Attorney, Agent, or Firm*—Jerome R. Drouillard; Roger L. May

[57] ABSTRACT

The invention relates to an engine manifold having a plurality of branches connecting respective engine ports to ambient air. Each branch of the manifold is connected to pass through an acoustic coupling (10) formed by a chamber (12) of shallow depth having conjugate foci and defined by two closely spaced end plates and acoustically reflective side walls. The branch section (14) of the manifold leading to an engine port (20) is connected to the coupling (10) at one of its conjugate foci. The branch section (18) leading to ambient air being connected to the coupling (12) at a point remote from its conjugate foci, and an acoustic reflector (16) is connected to one of the conjugate foci of the acoustic coupling (10) to reflect sound waves propagating along the branch section (14) leading to the engine port back towards the same engine port (20).

13 Claims, 1 Drawing Sheet

TUNED ENGINE MANIFOLD

FIELD OF THE INVENTION

The present invention relates to a tuned engine manifold and is applicable to both intake and exhaust manifolds.

BACKGROUND OF THE INVENTION

When air flows through a manifold of an engine, the flow along the branches of the manifold results not only in a mass transfer along the length of the branch but also in the transmission of sound waves or pressure waves along the branch. By appropriate tuning of the length of the branches, the sound waves can be used to enhance the charge density at the instant that the intake valves close and to improve scavenging of the exhaust gases at the instant that the exhaust valves close, thereby improving engine output power. In other cases, tuning may be required to reduce charge density at the time the intake valves close, for example to reduce pumping losses during part load operation or to increase the pressure at the time that the exhaust valve closes, so that internal exhaust gas recirculation is increased. In other words, the tuning of the manifold can be designed to reflect a positive or a negative pressure wave to the engine port at the time that the port valve closes, to enhance engine performance in a variety of ways.

Though their advantages have been known, tuned manifolds have hitherto been bulky and difficult to incorporate within the limited amount of the space available in the engine compartment and the present invention seeks to introduce greater flexibility into the design of a tuned engine manifold and to enable a tuned manifold of smaller dimensions to be produced.

SUMMARY OF THE INVENTION

According to the present invention, there is provided an engine manifold having a plurality of branches for connecting respective engine ports to ambient air, characterised in that each branch of the manifold is connected to pass through an acoustic coupling formed by a chamber of shallow depth having conjugate foci and defined by two closely spaced end plates and acoustically reflective side walls, the branch section of the manifold for connection to an engine port being connected to the coupling at one of its conjugate foci and the branch section leading, in use, to ambient air being connected to the coupling at a point remote from its conjugate foci, an acoustic reflector being connected to the other of the conjugate foci of the acoustic coupling such that in use sound waves propagating along the branch section leading to the engine port are reflected back towards the same engine port.

The acoustic coupling separates the mass air flow from the acoustic waves propagating along the manifold branches. When an acoustic wave created by the opening of a valve reaches the acoustic coupling chamber it does not flow along the branch section leading to ambient air but is focused by the coupling at the second of the conjugate foci. There the acoustic wave can be arranged to be reflected, with or without inversion, after following any desired path independent of the path of the mass flow thereby affording considerable flexibility in the design of the manifold.

The acoustic chamber may be generally elliptical, in which case the two conjugate foci are both real and lie on the major axis of the ellipse symmetrically about the minor axis. An ellipse can be drawn by connecting the ends of a slack piece of string to two fixed points, placing a pencil against the string and drawing the locus of the points at which the string is held taut by the pencil. The two fixed points are called conjugate foci because waves emanating from one and reflected by the elliptical boundary are always focused at the other. It is known for example that if a snooker table is formed in the shape of an ellipse, a ball struck without spin in any direction from one of the conjugate foci will always collide with another ball located at the other focus.

A complete ellipse is not however the only shape having conjugate foci. If, an ellipse is divided into halves or quarters by reflective walls lying on the minor and/or major axes, then there will still be two conjugate points of focus but in this case one will be real and the other will be the virtual image of the real focus in the reflective boundary.

The present invention takes advantage of this property of shapes which have conjugate foci, in designing an engine manifold. All sound waves emanating from one focus will reach the other focus and from these the waves can be reflected back to the first focus. Pressure waves will not readily otherwise escape from any other point on the end plates. This theoretical analysis presumes an essentially two dimensional wave propagation and it is for this reason that the chamber needs to be shallow.

A pressure wave introduced into the cavity through a branch with its axis normal to the plane of the chamber needs to be channelled in a suitable manner so as to propagate radially within the plane of the chamber. To this end, it is desirable to shape the branch connections to direct the acoustic waves in this manner through the chamber. For example, the end of the connections may be flared and a cone may be placed opposite the branch exit to define a trumpet like transition. This shaping also assists in redirecting the mass flow in order to reduce flow losses.

It is already known from U.S. Pat. No. 4,109,752 and U.S. Pat. No. 4,153,136 that an elliptical coupling chamber can be used to suppress noise in an exhaust silencer, or muffler. In these patents, a pipe carrying exhaust gases is arranged at one of the conjugate foci and a sound absorbing material is arranged at the other. These patents separate the sound from the mass air flow so that noise can be suppressed but they do not affect the tuned length of the manifold. It is important to notice in this respect that in these patents, the acoustic coupling chambers are arranged in a portion of the exhaust system common to all engine cylinders.

Though the present invention will reduce noise from an intake and exhaust manifolds of an engine (by reflective sounds back to the engine instead of letting them escape), its primary intention is to achieve manifold tuning. Thus, whereas in the invention the sound waves are reflected back to the port which generated them, in the prior art patents the sound waves are merely absorbed.

The invention offers an important advantage over prior art tuned manifolds in which the pressure waves follow the same path as the mass flow. Because the mass flow always leads to ambient air, be it for drawing in fresh air for the engine in the case of an inlet manifold or for discharging gases to atmosphere in the case of an exhaust manifold, the first reflection in prior art systems was inevitably accompanied by inversion of the pressure and consequently the wave had to traverse the length of the manifold four times before returning in the desired sense. This not only resulted in attenuation of the pressure wave but also at certain engine speeds the waves could return in the opposite sense to that desired and detract from engine performance. In the present invention, by contrast, the manifold can be designed to reflect the waves with or without inversion.

It is desirable to connect an acoustic coupling at the end of an intake branch near a plenum chamber common to all the intake branches to the engine cylinders, with the intake branch opening at one of the conjugate foci of the elliptical chamber and the branch leading to the plenum chamber lying on the axis of rotational symmetry of the elliptical chamber.

Instead of blanking off the second of the conjugate foci, the latter can be connected to the intake branch of another one of the cylinders of a multi-cylinder engine. In this case, the tuned length of branch is doubled without altering the outer dimensions of the manifold and the pressure pulse passes through the coupling from one intake branch to the other. As well as allowing resonance tuning to be performed at low speeds by providing a longer tuned length of manifold branch, this configuration also has the advantage that the air mass flows only through one of the intake branches and suffers less frictional losses than it would do when flowing along the entire tuned length of a longer intake branch.

It is also known to connect a resonator to the intake branch for sound suppression and to improve tuning. If desired, such a resonator may be connected to the coupling in line with one or other of the conjugate foci. The sound waves will in such a case be successfully confined to the intake branch and the resonator.

There have also been proposed in the past various systems for active tuning. Active tuning differs from passive tuning in that the pressure pulse is externally generated and timed to achieve the desired improvement in charge density at the instant that the intake valve closes. In any active tuning system a connector is required to inject the pressure wave into the intake branch, and it is desirable, in order to improve energy transfer and reduce noise, for the connector to be capable of directing most of the pressure wave energy towards the intake port.

An elliptical acoustic coupling may be used as such a connector by connecting the intake branch and the source of external pulses to the elliptical chamber in line with the conjugate foci and connecting the elliptical chamber to the plenum chamber common to all intake branches through a branch or opening arranged in line with the axis of rotational symmetry of the elliptical chamber.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
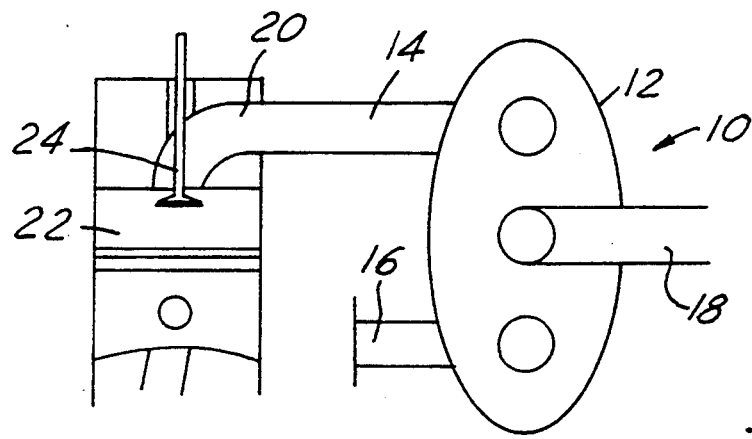
FIG. 1 is a schematic plan view of an acoustic coupling connected to an engine port.
Figure 2:
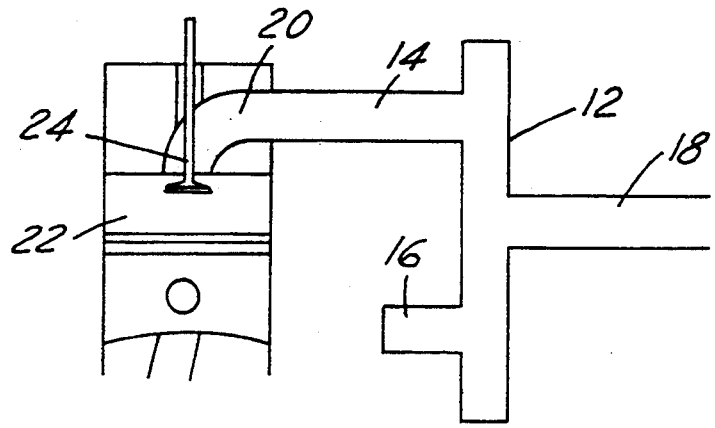
FIG. 2 is a schematic side view of the coupling in FIG. 1 also connected to an engine port.

An acoustic coupling 10 comprises an elliptical chamber 12 with connections for three branch sections 14, 16 and 18. The branch section 14 leads in the drawing to the intake port 20 of an engine cylinder 22. The branch section 16 is blanked off and the branch section 18 leads out to ambient through an intake throttle and an air filter (not shown).

Air to be introduced into the combustion chamber 22 is supplied along the branch section 18 and after passing through the elliptical chamber 12 flows along the branch section 14 to the intake port 20. This is thus the path for the mass air flow and it does not differ from the path in a conventional engine.

When the inlet valve 24 starts to open, at the beginning of a four stroke cycle, the combustion chamber is still under pressure from the exhaust stroke of the previous cycle and a pressure wave passes out of the intake port and propagates at the speed of sound along the branch section 14 towards the acoustic coupling 12. In a conventional tuned manifold, this wave would travel the entire length of the intake branch until is reaches a plenum chamber common to all the cylinders at which point the wave would be reflected with opposite phase. A further three traverses of the entire length of the intake branch and two reflections at the open and closed ends of the branch would be necessary before the wave could again reach the intake port as a positive pressure wave.

Figure 3:
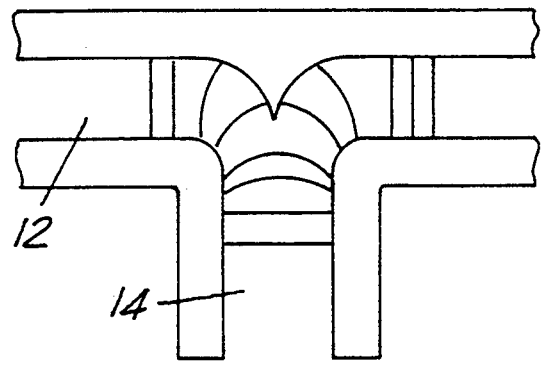
FIG. 3 shows in section a detail of the design of the connection between the elliptical chamber and each of the branches opening into it.

In FIG. 1, by contrast, the wave on reaching the acoustic coupling 12, as shown in FIG. 3, is converted into a wave in the plane of the elliptical chamber of the coupling 12 propagating radially from a point centered on the focus of the ellipse on which the branch section 14 lies. As previously explained, this wave will be reflected by the elliptical boundary and focused onto the second focus at which lies the branch section 16. The pressure wave will not therefore follow the same course as the mass flow and will instead be shunted into the sealed branch section 16 from the end of which it will be reflected without inversion. The reflected wave will follow the same path in the reverse direction and will reach the inlet port 20 without undergoing inversion.

Instead of the branch section 16 being blanked off and serving no other purpose, it may be the intake branch section for another engine cylinder the inlet valve of which would be closed at the time that the valve 24 is open.

As a further possibility, the branch section 16 can permit an external source of pressure waves, especially provided for active tuning, to be connected into the intake system in such a manner that all the pressure waves will travel to the intake port 20 instead of travelling in the wrong direction along the branch section 18. Instead of an active source, it is also possible to connect a resonator to the branch section 16 to modify the tuning characteristics and reduce intake noise.

It is alternatively possible for the branch sections 14 and 16 to be arranged on opposites sides of the chamber 12 at the same one of the conjugate foci. Indeed, there may be up to four branch sections connected at the conjugate foci on opposite sides of the chamber 12.

The branch section 18 can be positioned at any desired location remote from the conjugate foci but it is preferred to position it somewhere along the minor axis where coupling of the acoustic wave is weakest.

Though described above for the case of an intake manifold, it should be clear that the same method of connecting the individual manifold branches to an acoustic coupling can be applied to an exhaust manifold. When the exhaust valves open, a negative pressure wave is generated and this too can be reflected without inversion to improve scavenging of the exhaust gases. In this case, the reflection of the sound waves back to the exhaust ports will reduce the level of sound emitted by the exhaust pipe and this is a desirable side effect of the invention.

In the case of the embodiment shown in FIG. 1, no mass transfer takes place through the branch section 16 and this branch section acts only as a reflector. It will clear therefore that a reflective partition along the minor axis would serve the same purpose and such a half elliptical chamber would function in exactly the same manner as already described and would provide a more compact design.

As so far described, the manifolds have been designed to reflect pressure waves without inversion. The embodiment shown in FIG. 4 demonstrates how a manifold can be designed to reflect the pressure waves with inversion, for example to reduce pumping losses under part load operation. In this embodiment, a plenum chamber 30 is provided in the branch section 18 downstream of the engine intake throttle. The plenum chamber may be connected to all the engine cylinder so that pressure waves do not propagate through it or in it. The waves travelling along the branch section 34 will in this case be reflected with inversion on reaching the plenum chamber and will be returned to the port 14 via the branch section 34 and the acoustic coupling chamber.

Figure 4:
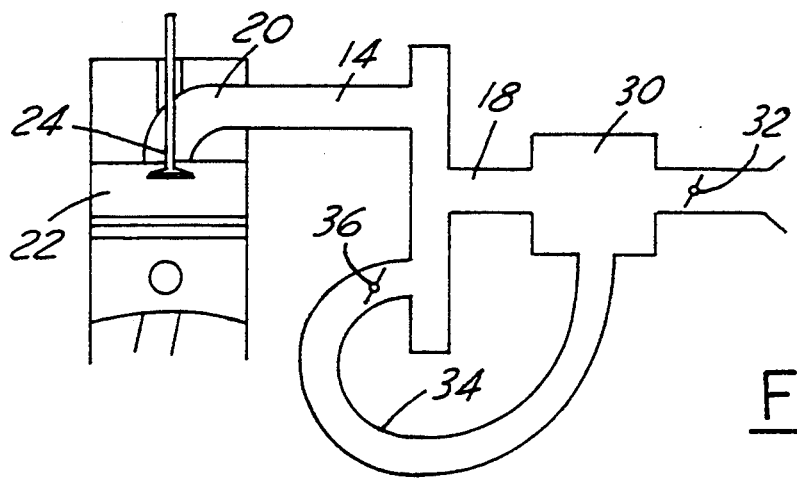
FIG. 4 is a schematic diagram similar to that of FIG. 2 showing a further embodiment of the invention.

FIG. 4 also shows that a variable throttle 36 may be arranged in the branch section 34. This throttle can alter the characteristics of the tuned manifold in that it can switch between reflection with inversion and reflection without inversion as a function of engine speed. Furthermore in intermediate positions, the throttle 36 can vary the energy in the reflected acoustic waves and regulate the tuning effect.

The ability to place one or more throttles in a closed branch section also allows the tuned length of the branch section to be varied as a function of engine speed, thereby allowing broad band tuning of both intake and exhaust manifolds.

It should also be mentioned that other means may be used to vary the effective length of the branch sections which carry sound waves but not mass flow.

I claim:

1. An engine manifold having at least one branch for connecting at least one engine port to ambient air, characterised in that each branch of the manifold is connected to pass through an acoustic coupling (10) formed by a chamber (12) of shallow depth having two conjugate foci and defined by two closely spaced end plates and acoustically reflective side walls, a first section of the branch connecting an engine port (20) to the acoustic coupling (10) juxtaposed to one of its conjugate foci and the branch (18) leading, in use, to ambient air being connected to the acoustic coupling (10) at a point remote from either conjugate foci, an acoustic reflector (16) being connected in juxtaposition to the remaining one of the conjugate foci of the acoustic coupling (10) such that in use sound waves propagating along the first branch section (14) leading to the engine port are reflected back towards the same engine port (20).

2. An engine manifold as claimed in claim 1, wherein the chamber (12) of the acoustic coupling is elliptical.

3. An engine manifold as claimed in claim 1, wherein the chamber (12) of the acoustic coupling is shaped as a sector of an ellipse formed by dividing an ellipse into at least two parts by means of reflective walls lying on major or minor axes of the ellipse.

4. An engine manifold as claimed in claim 1, wherein the connections of the branch sections to the chamber of the acoustic coupling are flared to convert plane waves propagating along the branch sections into circular waves in the plane of tile acoustic chamber radiating from the center of the connections.

5. An engine manifold as claimed in claim 1, wherein the acoustic reflector is a blanked off branch section (16).

6. An engine manifold as claimed in claim 5, wherein means are provided for varying the effective length of the blanked off branch section (16).

7. An engine manifold as claimed in claim 1, wherein the acoustic reflector is a branch section (16) leading, in use, to another engine port.

8. An engine manifold as claimed in claim 1, wherein the acoustic reflector is a branch section (34) leading to a plenum chamber (30) arranged in the second branch section (18) leading, in use, to ambient air.

9. An engine manifold as claimed in claim 8, wherein a throttle (36) is arranged in the branch section (34) leading to the plenum chamber (30).

10. An engine manifold as claimed in claim 1, wherein the acoustic reflector is a branch section connected to an external active source of pressure waves.

11. An engine manifold as claimed in claim 1, wherein the acoustic reflector is a branch section connected to a resonator.

12. An engine manifold as claimed in claim 1 constructed as an intake manifold, in which the second branch section leading to ambient air is connected to an intake opening by way of an intake throttle (32).

13. An engine manifold as claimed in claim 1, constructed as an exhaust manifold, in which the second branch section leading to ambient air is connected to a discharge opening.

* * * * *